United States Patent
Bond et al.

(10) Patent No.: US 8,277,046 B2
(45) Date of Patent: Oct. 2, 2012

(54) EYEGLASS RETENTION APPARATUS

(76) Inventors: Alice Bond, Brooksville, FL (US);
Embry Smith, Brooksville, FL (US)

( * ) Notice: Subject to any disclaimer, the term of this patent is extended or adjusted under 35 U.S.C. 154(b) by 395 days.

(21) Appl. No.: 12/715,145

(22) Filed: Mar. 1, 2010

(65) Prior Publication Data

US 2010/0220284 A1   Sep. 2, 2010

Related U.S. Application Data

(60) Provisional application No. 61/156,098, filed on Feb. 27, 2009.

(51) Int. Cl.
*G02C 3/00* (2006.01)
(52) U.S. Cl. .............................. 351/157; 351/156; 24/3.3
(58) Field of Classification Search .................. 351/157, 351/156, 158, 41; 24/3.3
See application file for complete search history.

(56) References Cited

U.S. PATENT DOCUMENTS 3,588,960 A * 6/1971 McClellan et al. .............. 24/3.3
3,827,790 A * 8/1974 Wenzel .......................... 351/123
3,879,804 A * 4/1975 Lawrence ......................... 24/3.4

* cited by examiner

*Primary Examiner* — Hung Dang
(74) *Attorney, Agent, or Firm* — Johnson & Martin, P.A.; James David Johnson

(57) ABSTRACT

An eyeglass retainer that features an elongated flexible segment of linear cylindrical material having a first end and a second end. Each end of the material can be tied into a knot so that each knot forms a loop of the material. Each of the two knots can be slidably adjustable over the length of the material so that each loop can be decreased in diameter to tighten the loop around a temple of a pair of eyeglasses. The small diameter and transparency of the material reduce the visibility of the eyeglass retainer to diminish its contrast with a wearer's clothing.

20 Claims, 1 Drawing Sheet

EYEGLASS RETENTION APPARATUS

CROSS-REFERENCE TO RELATED APPLICATION

This application claims the priority from U.S. provisional patent application Ser. No. 61/156,098 filed Feb. 27, 2009. The foregoing application is incorporated in its entirety herein by reference.

FIELD OF THE INVENTION

The invention relates to methods and apparatuses for securing eyeglasses. More particularly, the invention relates to methods and apparatuses for securing eyeglasses to an eyeglass wearer using an eyeglass retainer that can be secured to the eyeglasses.

BACKGROUND

Eyeglasses, including sunglasses, are worn frequently by a large percentage of individuals. Even for individuals not suffering from vision problems that require corrective lenses, many individuals wear sunglasses to protect their eyes from sun and bright light damage as well as for reasons related to fashion. Eyeglasses are often temporarily misplaced or lost permanently by their wearers when a wearer removes the eyeglasses and leaves them lying in a forgotten location or when the eyeglasses are accidentally dropped or fall from the wearer's face.

Conventional eyeglass retainers, also known as eyeglass or sunglass leashes or cords, are often large and unattractive in appearance. The conventional retainers are frequently constructed from material similar in appearance and size to a shoestring that might be used with a tennis shoe or to a ribbon material such as that often connected to a keychain or neck lanyard, and can be difficult to hide when worn by an eyeglass wearer. Conventional eyeglass retainers are also disadvantageous because the attachment pieces, which are typically constructed from an elastic textile or elastomeric material, for connecting to the temples of the eyeglasses may experience a loosening of their gripping or retaining ability over time and as result of exposure to the elements and to bodily fluids such as human sweat that may erode or otherwise break down the material from which the attachment pieces are constructed. As the attachments pieces loosen, the eyeglasses may become disengaged from the conventional retainer and drop from the wearer's body, thereby resulting in the loss of or damage to the eyeglasses.

Another disadvantage of conventional eyeglass retainers is that the material from which they are constructed are disposed to fading and staining by contact with the wearer's sweat and exposure to the elements.

A need exists for an eyeglass retainer that attaches more securely to a pair of eyeglasses than the apparatuses and methods currently employed by conventional eyeglass and sunglass retainers. A need also exists for an eyeglass retainer that is less visible and noticeable to other persons who are viewing the eyeglass retainer wearer. A further need exists for an eyeglass retainer that is resistant to fading, staining, and breaking caused by exposure to the elements and the sweat of the wearer as well as to abrasive forces experienced by the eyeglass retainer during wearing by the wearer.

SUMMARY

The apparatuses and methods described herein relate to an eyeglass retainer that features an elongated flexible segment of linear cylindrical material having two ends. Each end of the material can be tied into a knot so that each knot forms a loop of the material. Each of the two knots can be slidably adjustable over the length of the material so that each loop can be decreased in diameter to tighten the loop around a temple of a pair of eyeglasses. The material can be similar in gauge and transparency to fishing line, for example, the material can be almost completely transparent or may have a slight color tint thereby reducing the contrast of the eyeglass retainer with a wearer's clothing, skin or hair. The eyeglass retainer may be used with any type of eyeglasses including sunglasses.

An advantage of the apparatuses and methods described herein is that the adjustable loops of the eyeglass retainer can be securely and tightly connected around the temples of the eyeglasses to secure the eyeglasses around the neck of the wearer.

Another advantage of the apparatuses and methods described herein is that the diameter and size of the material from which the eyeglass retainer is made is much smaller than the size of the material used to construct conventional eyeglass retainers, thereby permitting the wearer to hide or reduce the visibility of the eyeglass retainer as it is worn.

Still another advantage of the apparatuses and methods described herein is that the eyeglass retainer is lightweight, does not restrict the wearer's movement, and is virtually unnoticeable by the wearer when worn.

Yet a further advantage of the apparatuses and methods described herein is that the eyeglass retainer is resistant to fading, staining and breakage caused by exposure to the elements and the sweat of the wearer as well as to abrasive forces experienced by the eyeglass retainer during wearing by the wearer.

Accordingly, the invention features an eyeglass retainer having an elongated flexible segment of linear cylindrical material that includes two ends, each end being tied into a knot forming a loop of the material. The knot can be slidably adjusted over the length of the material, and each loop can be decreased in diameter to tighten the loop around a temple of a pair of eyeglasses.

Accordingly, the invention features an eyeglass retainer. The eyeglass retainer can include an elongated flexible segment of linear cylindrical material having two ends. Each end can be tied into a knot that features a loop of the linear cylindrical material. The knot can be slidably adjustable over the length of the linear cylindrical material, and each loop can be decreased in diameter to tighten the loop around a temple of a pair of eyeglasses.

In another aspect, the invention can feature the linear cylindrical material being a single monofilament.

In another aspect, the invention can feature the linear cylindrical material being a plurality of intertwined monofilaments.

In another aspect, the invention can feature the linear cylindrical material being at least one synthetic fiber selected from among: fluorocarbon, nylon, polyethylene, any other suitable copolymer, and any other suitable synthetic fiber.

In another aspect, the invention can feature the linear cylindrical material being at least one natural fiber selected from among: wool, any other suitable animal hair, cotton, flax, hemp, silk, and any other natural plant fiber.

In another aspect, the invention can feature the elongated flexible segment including a coating of a waterproofing agent.

In another aspect, the invention can feature the elongated flexible segment being transparent.

In another aspect, the invention can feature the elongated flexible segment being translucent.

In another aspect, the invention can feature the elongated flexible segment being opaque.

In another aspect, the invention can feature the elongated flexible segment including a color tint.

In another aspect, the invention can feature the linear cylindrical material of the elongated flexible segment being a material that is not readily visible to a human observer.

In another aspect, the invention can feature the linear cylindrical material of the elongated flexible segment being fishing line.

In another aspect, the invention can feature the elongated flexible segment being constructed in a length sufficient to permit the eyeglasses to be suspended below a wearer's neck when the eyeglasses are removed from the wearer's face.

In another aspect, the invention can feature the eyeglasses being sunglasses.

In another aspect, the invention can feature the linear cylindrical material being lightweight, extra limp fishing line.

A method of the invention can be used to retain eyeglasses around a neck of a wearer. The method includes the steps of: (a) placing a first loop of an elongated flexible segment of linear cylindrical material around a first temple of a pair of eyeglasses so as to encircle the first temple; (b) twisting a top of the first loop once into a "figure 8" loop configuration; (c) sliding the top of the first loop down over the first temple to tighten the first loop around the first temple by forming a knot around the first temple; and (d) repeating steps (a) through (c) in connection with a second loop of the elongated flexible segment of linear cylindrical material and a second temple of the pair of eyeglasses.

Another method of the invention can include the step of twisting the first loop a plurality of times to create a multi-loop configuration.

Another method of the invention can include the elongated flexible segment of linear cylindrical material and its first and second loops forming an eyeglass retainer apparatus.

Another method of the invention can include the step of (e) securing the eyeglass retainer apparatus to the eyeglasses during manufacturing.

Another method of the invention can include the step of (f) manufacturing the elongated flexible segment of linear cylindrical material from a material that is transparent so as not to be readily visible to a human observer.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
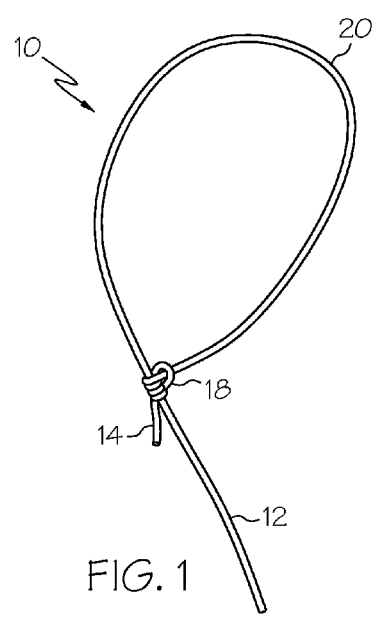
FIG. 1 is a perspective view of a knot and a loop of an eyeglass retainer.
Figure 2:
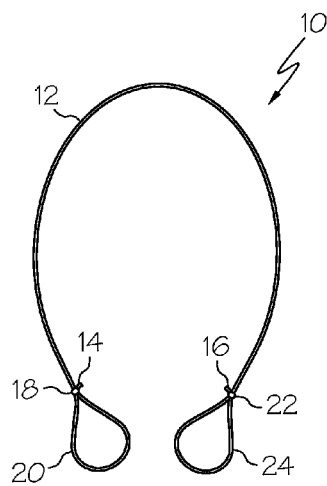
FIG. 2 is a schematic view of an eyeglass retainer.
Figure 3A:
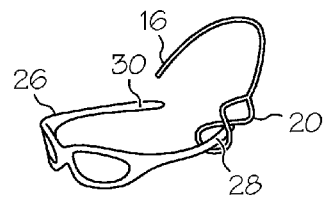
FIG. 3A is a perspective view of one end of the eyeglass retainer of FIG. 2 being positioned around a temple of a pair of eyeglasses.
Figure 3B:
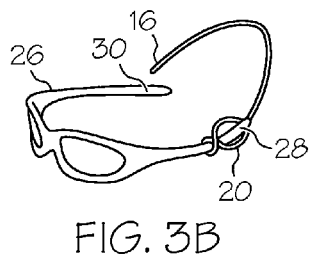
FIG. 3B is a perspective view of one end of the eyeglass retainer of FIG. 2 being secured around the temple of the pair of eyeglasses.
Figure 3C:
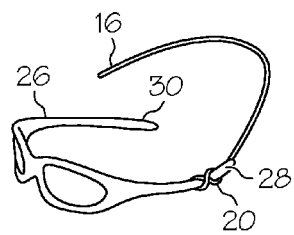
FIG. 3C is a perspective view of one end of the eyeglass retainer of FIG. 2 attached around the temple of the pair of eyeglasses.

The invention provides an eyeglass retainer 10 that features an elongated flexible segment 12 of linear cylindrical material having a first end and a second end. As shown in FIGS. 1 and 2, both the first end 14 and the second end 16 of the material each can be tied into a knot so that each knot forms a loop of the material. Thus, the first end 14 includes a first knot 18 that forms a first loop 20, and the second end 16 includes a second knot 22 that forms a second loop 24. Each of the first knot 18 and second knot 22 can be slidably adjustable over the length of the material so that each loop 20, 24 can be decreased in diameter to tighten the loops around two temples of a pair of eyeglasses 26 as shown in FIGS. 3A-3C. For example, the first loop 20 can be tightened and secured around a first temple 28 and the second loop 24 can be tightened and secured around a second temple 30 of the eyeglasses 26.

The eyeglasses may be vision corrective eyeglasses, reading glasses, sunglasses, vanity glasses, or any other type of eyeglasses that are worn on the face.

The material of the eyeglass retainer may feature a monofilament or a plurality of intertwined or braided monofilaments that form a single string. The eyeglass retainer can be constructed from a single material or a combination of materials such as, for example, fluorocarbon, nylon, polyethylene, or other suitable copolymers. In an exemplary embodiment, the material can be an artificial material such as one of those aforementioned. In another embodiment, the material can be a natural material such as, for example, wool or another animal hair, cotton, flax, hemp, or silk. The material may be coated with a waterproofing agent such as, for example, polyvinyl chloride.

The material selected for construction of the eyeglass retainer can be of small, thin diameter to reduce its visibility and can have superior resistance to abrasion and superior knot strength and breaking strength. The material can also be lightweight and have a high degree of limpness. In an exemplary embodiment, the material of the eyeglass retainer can be transparent. In other exemplary embodiments, the material can be translucent. In another embodiment, the material can be opaque or nearly opaque. The material can be made in any color or tint desired. For example, the material could be colored or tinted red, orange, yellow, green, blue, indigo, violet, or any other color. In one embodiment, the material can be fluorescent. The material can be similar in gauge and transparency to fishing line, for example, the material can be almost completely transparent or may have a slight color tint thereby reducing the contrast of the eyeglass retainer with a wearer's clothing, skin or hair. In an exemplary embodiment, the material can have a low refractive index so as to enhance its "invisibility" when worn by the wearer. In another exemplary embodiment, fishing line is used as the material forming the eyeglass retainer. The fishing line can be of the lightweight, flexible, extra limp type so that the wearer does not notice the eyeglass retainer apparatus when wearing it and so that the elongated flexible segment of linear cylindrical material drapes flexibly over the wearer and the wearer's clothing rather than curling as would occur if stiffer, less limp material were used.

In an exemplary embodiment, the segment of material can be about 26 inches long. In another embodiment, the segment of material can have a length in a range of about 24-28 inches.

The segment of material can be about 19, 20, 21, 22, 23, 25, 27, 29, 30, 31, 32, 35, 36, 39, 40, 48, 52 or 53 inches long.

The average diameter of the material can be about 0.09, 0.1, 0.12, 0.15, 0.17, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.45, 0.5, 0.6, 0.7, 0.75, 0.8, 0.9, 0.95, 1, 1.2, 1.4, 1.5, 1.6, 1.75, 1.8, 1.9, 1.99, 2, 2.1, 2.2, 2.25, 2.3, 2.4, 2.5, 2.6, 2.75, 2.8, 2.9, 3, 3.5, 4, 4.5, 5 or 6 millimeters.

The invention also provides methods for securing eyeglasses, including sunglasses, to a wearer's body around the wearer's neck. The method can also be used by the wearer to hold the eyeglasses in the wearer's hand or to secure the eyeglasses around another body part of the wearer such as, for example, a wrist or arm of the wearer. As shown in FIG. 3A, the method can include the step of placing a first loop of an eyeglass retainer, for example, the eyeglass retainer described above, over a first temple of a pair of eyeglasses. Once the first loop is placed around the first temple so as to encircle the first temple, a top of the first loop may be twisted once, e.g., by manual manipulation, into a "figure 8" loop configuration. In other embodiments, the first loop may be twisted two, three, four, or more times to create a multi-loop configuration before proceeding to the next step of the method.

Next, as shown in FIG. 3B, the top of the "figure 8" loop formed in the previous step may be slid down over the temple to tighten the loop around the first temple by decreasing the diameter of the first loop until the eyeglass retainer is secured in a knot around the first temple.

The steps of the method can then be repeated using a second loop of the eyeglass retainer to secure the eyeglass retainer around a second temple of the pair of eyeglasses. The steps of the method can be performed manually by the wearer or another person.

While the "figure 8" loop configuration type knot may be used with the method, the method also contemplates the use of any other suitable type of knot that may be used to secure two loose ends of the elongated flexible segment of linear cylindrical material to each temple of the pair of eyeglasses.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An eyeglass retainer, comprising:
an elongated flexible segment of linear cylindrical material comprising two ends, each end being tied into a knot comprising a loop of the material, the knot being slidably adjustable over the length of the material, and wherein each loop can be decreased in diameter to tighten the loop around a temple of a pair of eyeglasses.

2. The eyeglass retainer of claim 1, wherein the linear cylindrical material comprises a single monofilament.

3. The eyeglass retainer of claim 1, wherein the linear cylindrical material comprises a plurality of intertwined monofilaments.

4. The eyeglass retainer of claim 1, wherein the linear cylindrical material comprises at least one synthetic fiber selected from the group consisting of: fluorocarbon, nylon, polyethylene, any other suitable copolymer, and any other suitable synthetic fiber.

5. The eyeglass retainer of claim 1, wherein the linear cylindrical material comprises at least one natural fiber selected from the group consisting of: wool, any other suitable animal hair, cotton, flax, hemp, silk, and any other natural plant fiber.

6. The eyeglass retainer of claim 1, wherein the elongated flexible segment comprises a coating of a waterproofing agent.

7. The eyeglass retainer of claim 1, wherein the elongated flexible segment is transparent.

8. The eyeglass retainer of claim 1, wherein the elongated flexible segment is translucent.

9. The eyeglass retainer of claim 1, wherein the elongated flexible segment is opaque.

10. The eyeglass retainer of claim 1, wherein the elongated flexible segment comprises a color tint.

11. The eyeglass retainer of claim 1, wherein the linear cylindrical material of the elongated flexible segment comprises a material that is not readily visible to a human observer.

12. The eyeglass retainer of claim 1, wherein the linear cylindrical material of the elongated flexible segment comprises fishing line.

13. The eyeglass retainer of claim 1, wherein the elongated flexible segment is constructed in a length sufficient to permit the eyeglasses to be suspended below a wearer's neck when the eyeglasses are removed from the wearer's face.

14. The eyeglass retainer of claim 1, wherein the eyeglasses are sunglasses.

15. The eyeglass retainer of claim 1, wherein the linear cylindrical material comprises lightweight, extra limp fishing line.

16. A method for retaining eyeglasses around a neck of a wearer, the method comprising the steps of:
    (a) placing a first loop of an elongated flexible segment of linear cylindrical material around a first temple of a pair of eyeglasses so as to encircle the first temple;
    (b) twisting a top of the first loop once into a "figure 8" loop configuration;
    (c) sliding the top of the first loop down over the first temple to tighten the first loop around the first temple by forming a knot around the first temple; and
    (d) repeating steps (a) through (c) in connection with a second loop of the elongated flexible segment of linear cylindrical material and a second temple of the pair of eyeglasses.

17. The method of claim 16, wherein step (b) of the method further comprises the step of twisting the first loop a plurality of times to create a multi-loop configuration.

18. The method of claim 16, wherein the elongated flexible segment of linear cylindrical material and its first and second loops comprise an eyeglass retainer apparatus.

19. The method of claim 18, wherein the method further comprises the step of:
    (e) securing the eyeglass retainer apparatus to the eyeglasses during manufacturing.

20. The method of claim 16, wherein the method further comprises the step of:
    (f) manufacturing the elongated flexible segment of linear cylindrical material from a material that is transparent so as not to be readily visible to a human observer.

* * * * *